US 11,495,089 B2

(12) United States Patent
Shigeta (10) Patent No.: US 11,495,089 B2
(45) Date of Patent: *Nov. 8, 2022

(54) FRAUDULENCE MONITORING SYSTEM OF TABLE GAME AND FRAUDULENCE MONITORING PROGRAM OF TABLE GAME

(71) Applicant: ANGEL GROUP CO., LTD., Shiga (JP)

(72) Inventor: Yasushi Shigeta, Shiga (JP)

(73) Assignee: ANGEL GROUP CO., LTD., Shiga (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/325,648

(22) Filed: May 20, 2021

(65) Prior Publication Data

US 2021/0295644 A1    Sep. 23, 2021

Related U.S. Application Data

(63) Continuation of application No. 16/134,627, filed on Sep. 18, 2018, now Pat. No. 11,049,362.

(30) Foreign Application Priority Data

Sep. 21, 2017   (JP) ................. 2017-198037

(51) Int. Cl.
*G07F 17/32* (2006.01)
*G06F 17/18* (2006.01)
(Continued)

(52) U.S. Cl.
CPC .......... *G07F 17/3241* (2013.01); *G06F 17/18* (2013.01); *G06V 20/10* (2022.01);
(Continued)

(58) Field of Classification Search
CPC .... G07F 17/3241; G07F 17/322; G07F 17/18; G07F 17/3239; G06K 9/00664;
(Continued)

(56) References Cited

U.S. PATENT DOCUMENTS 5,496,032 A    3/1996  Okada
6,126,542 A    10/2000 Fier
(Continued)

FOREIGN PATENT DOCUMENTS

AU    2016210614 A1    2/2017
CA     2994637 A1      2/2017
(Continued)

OTHER PUBLICATIONS

EESR dated Jun. 30, 2021 issued in EP application 18859524.3 cited the patent documents above.
(Continued)

*Primary Examiner* — Werner G Garner
(74) *Attorney, Agent, or Firm* — Norton Rose Fulbright US LLP (57) ABSTRACT

A detection system of the present disclosure stores positions and the amount of game tokens that a game participant places on a game table based on a measurement result by a bet chip measuring device in the same persons for each game participant or player positions of the game table. A management control device compares an actual winning rate and a total return amount with figures obtained by a probability statistic calculation at the time of an end of the number of games to determine whether there is a significant difference therebetween and specifies any one of the game participant or the player position, the game table, or a room having the game table where the significant difference is occurring.

20 Claims, 9 Drawing Sheets

(51) Int. Cl.
*G06V 20/10* (2022.01)
*G06V 20/52* (2022.01)

(52) U.S. Cl.
CPC ............ *G06V 20/52* (2022.01); *G07F 17/322* (2013.01); *G07F 17/3239* (2013.01)

(58) Field of Classification Search
CPC .... G06K 9/00771; G06F 17/18; G06V 20/52; G06V 20/10
See application file for complete search history.

(56) References Cited

U.S. PATENT DOCUMENTS

| | | |
|---|---|---|
| 2002/0042298 A1 | 4/2002 | Soltys et al. |
| 2002/0042299 A1 | 4/2002 | Soltys et al. |
| 2003/0064798 A1 | 4/2003 | Grauzer et al. |
| 2004/0219975 A1 | 11/2004 | Soltys et al. |
| 2005/0153772 A1 | 7/2005 | Griswold et al. |
| 2006/0019739 A1 | 1/2006 | Soltys et al. |
| 2006/0121971 A1 | 6/2006 | Slomiany et al. |
| 2006/0202422 A1 | 9/2006 | Bahar |
| 2007/0158906 A1 | 7/2007 | Mourad |
| 2008/0113783 A1 | 5/2008 | Czyzewski et al. |
| 2009/0191933 A1 | 7/2009 | French |
| 2016/0104346 A1 | 4/2016 | Avalle et al. |
| 2017/0039807 A1 | 2/2017 | Shigeta |
| 2017/0053484 A1 | 2/2017 | Takeda |
| 2019/0088082 A1 | 3/2019 | Shigeta |

FOREIGN PATENT DOCUMENTS

| | | |
|---|---|---|
| CN | 1095305 A | 11/1994 |
| CN | 1942905 A | 4/2007 |
| CN | 1954346 A | 4/2007 |
| CN | 106408785 A | 2/2017 |
| JP | H06-261979 A | 9/1994 |
| JP | 2007-517625 A | 7/2007 |
| JP | 2017-038729 A | 2/2017 |
| JP | 2017-064386 A | 4/2017 |
| JP | 2017094101 A | 6/2017 |
| JP | 2019055186 A | 4/2019 |
| WO | 2003082420 A1 | 10/2003 |
| WO | 2015/107902 A1 | 7/2015 |

OTHER PUBLICATIONS

EESR dated Jun. 30, 2020 issued in EP application 18859524.3 cited the patent documents above.
Chinese Office Action dated Nov. 8, 2021 issued in CN application 201811109059.9 cited the patent documents above.
International Search Report dated Dec. 25, 2018 issued in PCT Application PCT/JP2018/034604 cites the patent documents above.
Macao Office Action dated Sep. 3, 2019 issued in Macao Application I/001584 cites the patent documents above.
Australian Examination Report No. 1 dated Sep. 18, 2019 issued in Australian Application 2018232941 cites the patent documents above.
Japanese Office Action dated Jun. 7, 2022 issued in JP application 2020-031612.

FRAUDULENCE MONITORING SYSTEM OF TABLE GAME AND FRAUDULENCE MONITORING PROGRAM OF TABLE GAME

CROSS REFERENCE TO RELATED APPLICATION

The present application is a continuation of U.S. patent application Ser. No. 16/134,627 filed Sep. 18, 2018, which claims priority to JP Pat. App. No. 2017-198037 filed Sep. 21, 2017, the entire contents of each disclosure is hereby incorporated by reference.

FIELD OF THE INVENTION

The present disclosure relates to a fraudulence monitoring system of a table game in a game hall, and more particularly, to a technology for detecting a fraudulent act.

BACKGROUND

Attempts are being made to prevent various fraudulent acts in a game hall such as a casino. The game hall has surveillance cameras for monitoring fraudulent acts and prevents fraudulence by determining fraudulence during a game and fraudulence by collection or repayment of chips different from a win or lose result using images obtained from the surveillance cameras. Meanwhile, it is suggested to grasp an amount of chips by attaching an IC tag to each chip in order to grasp the number of betted chips and a total amount of betted chips.

PCT/JP 2015/000171 discloses a card game monitoring system which determines whether chips placed on a game table are collected or repaid as a win or lose result by performing an image analysis on a movement of chips and monitors a fraudulent act.

In the game hall such as the casino, the game table is recorded by the surveillance camera, and when the amount of money won at a time by a game participant is large, the recorded VTR is played to confirm whether or not there is a fraudulent act. However, there is a problem that fraudulence such as sophisticated fraudulence acts in a game table and continuous winning of a small amount of money cannot be found by simply detecting that the game participant wins the large amount of money. In addition, the related art does not sufficiently prevent a fraudulence act by collusion of a dealer and a player.

An object of the present disclosure is to prevent damage due to a fraudulent act by continuously monitoring an amount betted by a game participant and win or lose of a game, comparing data of a probability statistic calculation or past statistical data, and detecting a suspicious pattern suspected of being fraudulent.

SUMMARY

To solve the above conventional problem, a fraudulence monitoring system of a table game includes: a win and lose determination device which determines win and lose results for each game in a game table; a bet chip measuring device which grasps an amount of game tokens that a game participant bets on the game table in each game; and a management control device which stores the number of games performed on the game table and specifies positions and the amount of game tokens that the game participant places on the game table based on a measurement result by the bet chip measuring device in each game and stores the specified positions and amount of game tokens in each game participant or player positions of the game table, wherein the management control device includes a calculation function which compares results of an actual winning rate and a total return amount of the same person in each game participant or player position with figures obtained by a probability statistic calculation at the time of an end of a predetermined number of games, on the basis of a calculation on a total number of games in which the same person participates in each game participant or player position, a transition of bet chip amounts for each game, a win and lose for each game, and a return amount obtained in each game to determine whether there is a significant difference therebetween, and specifies any one of the game participant or player position, the game table, or a room having the game table where the significant difference is occurring.

The management control device may further include a function which specifies dealers in each game and include a function which specifies a dealer responsible for a series of games in which the significant difference occurs.

The management control device may include a calculation function which factorizes the total return amount in a series of games in which the significant difference occurs to specify whether an occurrence cause of the significant difference in the series of games in which the significant difference occurs is due to the winning rate or due to a magnitude of a betted amount of the bet chip.

The management control device may include a calculation function which stores the bet chip amounts for each game at the bet position having different return rates, and specifies whether the occurrence cause of the significant difference in a series of games in which the significant difference has occurred is associated with the bet position having different return rates.

The management control device may have a plurality of criteria which determine whether there is a significant difference and issue a different kind of warnings for each criterion.

The management control device may have different determination criteria of a different significant difference for the number of games divided by a predetermined rule or for each of the predetermined number of games and issue a different kind of warnings.

The management control device may determine whether there are significant differences for each game sequentially or every time the predetermined number of games is progressed in accordance with the progress of the plurality of games, and issue a warning when the determination criteria on the significant difference exceed.

The management control device may have a plurality of criteria which determine whether there is a significant difference and specify the game participant or the player position having the fraudulence possibility for each criterion to be able to display scores for each different criteria and display scores or ranks for warnings.

The management control device may obtain the figures obtained by the probability statistic calculation used to determine whether there is a significant difference based on a conditional probability calculation when a specific element is a fixed value.

The management control device may further include a function which sequentially grasps the spots from the playing cards or spots of dice from a series of games, and estimates the fraudulence cause in the case in which it is determined that there is a significant difference based on the data of the spots from a series of games and enumerates the fraudulence cause with the possibility.

The management control device may estimate the fraudulence cause determined that there is the significant difference using any one or both of big data on past games or past fraudulent data, and enumerate the cause with the fraudulence possibility.

To solve the above conventional problem, the fraudulence monitoring system of the present invention may adopt the following form. A fraudulence monitoring system of a table game, includes: an income and expenditure grasping device which grasps income and expenditure of a casino side for each game table in a plurality of game tables; and a management control device which stores the number of games performed on each game table and sequentially grasps and stores a transition of the income and expenditure of the casino side in each game, wherein the management control device includes a calculation function which compares results of the income or expenditure of the casino side with figures obtained by a probability statistic calculation at the time of an end of a predetermined number of games, on the basis of a calculation on a total number of games performed on each game table and the transition of the income and expenditure of the casino side in each game to determine whether there is a significant difference therebetween, and specifies any one of the game table or a room having the game table where the significant difference is occurring.

To solve the above conventional problem, the fraudulence monitoring system of the present invention may adopt the following form. A fraudulence monitoring system of a table game, includes: a win and lose determination device which determines win and lose results for each game in a game table; a bet chip measuring device which grasps an amount of game tokens that a game participant bets on the game table in each game; and a management control device which stores the number of games performed on the game table and specifies positions and the amount of game tokens that the game participant places on the game table using a measurement result by the bet chip measuring device in each game and stores the specified positions and amount of game tokens in each game participant or player positions of the game table, wherein the management control device includes artificial intelligence having past data of a fraudulent game taught as training data, and further includes a calculation function which determines whether a significant difference with fraudulence possibility occurs in any one of the game participant or player position, the game table, or a room having the game table at the time of an end of a predetermined number of games, on the basis of a calculation on a total number of games in which the same person participates in each game participant or player position, a transition of bet chip amounts for each game, a win and lose for each game, and a return amount obtained in each game.

The management control device may further include a function which specifies dealers in each game and include a function which specifies the dealer responsible for a series of games in which the significant difference occurs.

The management control device may include a calculation function which factorizes the total return amount in a series of games in which the significant difference occurs to specify whether an occurrence cause of the significant difference in the series of games in which the significant difference occurs is due to the winning rate or due to a magnitude of a betted amount of a bet chip.

The management control device may include a calculation function which stores the bet chip amounts for each game at the bet position having different return rates, and specifies whether the occurrence cause of the significant difference in a series of games in which the significant difference has occurred is associated with the bet position having different return rates.

The management control device may have a plurality of criteria which determine whether there is a significant difference and issue a different kind of warnings for each criterion.

The management control device may have different criteria of a different significant difference for the number of games divided by a predetermined rule or for each of the predetermined number of games and issue a different kind of warnings.

The management control device may have a plurality of criteria which determine whether there is a significant difference and specify the game participant or the player position having the fraudulence possibility for each criterion to be able to display scores for each different criterion and display scores or ranks for warnings.

The management control device may further include a function which sequentially grasps the spots from playing cards or spots of dice from a series of games, and estimates the fraudulence cause in the case in which it is determined that there is a significant difference based on the data of the spots from a series of games and enumerates the fraudulence cause with the possibility.

The management control device may estimate the fraudulence cause in the case in which there is a significant difference using the big data about the past game as an additional item and enumerate the causes with the fraudulence possibility.

To solve the above conventional problem, the fraudulence monitoring system of the present invention may adopt the following form. A fraudulence monitoring system of a table game, includes: an income and expenditure grasping device which grasps income and expenditure of a casino side for each game table in a plurality of game tables; and a management control device which stores the number of games performed on each game table and sequentially grasps and stores a transition of the income and expenditure of the casino side in each game, wherein the management control device includes artificial intelligence having data of a past fraudulent game taught as training data, and further includes a calculation function which compares results of the income or expenditure of the casino side with figures obtained by a calculation of the artificial intelligence having the data of the past fraudulent game taught as the training data on the basis of a calculation on a total number of games performed on each game table and the transition of the income and expenditure of the casino side in each game to determine whether there is a significant difference therebetween, and determines a possibility that fraudulence occur in any one of the game table or a room having the game table where the significant difference is occurring.

To solve the above conventional problem, the fraudulence monitoring system of the present invention may adopt the following form. A fraudulence monitoring program of a table game, includes: a win and lose determining step of grasping win and lose results for each game in a game table; a bet chip grasping step of grasping an amount of game tokens that a game participant bets on the game table in each game; a game progressing, grasping, managing step of storing the number of games performed on the game table and specifying bet patterns of the game tokens that the game participant places on the game table using transition data of a bet chip in the bet chip grasping step in each game and storing the specified bet patterns in each game participant or player positions of the game table; and a step of verifying occurrence possibility of a fraudulence act, wherein the step of verifying the occurrence possibility of the fraudulence act includes a step of calculating an actual winning rate of the same person in each game participant or player position and a step of calculating a total return amount at the time of an end of a predetermined number of games end, on the basis of grasping and calculating a total number of games in which the same person participates in each game participant or player position, a transition of a bet chip amount, and a return amount for each game, a significant different determining step of comparing the obtained winning rate and total return amount with a winning rate and a total return amount based on a probability statistic calculation or past data to determine whether there is a significant difference therebetween in the predetermined number of games, and an abnormal spot determining step of specifying any one of the game participant or player position, the game table, or a room having the game table where the significant difference is occurring.

The step of verifying the occurrence possibility of the fraudulence act may further include a step of specifying dealers in each game and has a step of specifying the dealer responsible for the series of games in which the significant difference occurs in the abnormal spot determining step.

The step of verifying the occurrence possibility of the fraudulence act may further include an artificial intelligence learning step that learns data of a past fraudulent game as training data.

The fraudulence monitoring system of a table game may further include: a device which specifies the game participant of the game table from the information on a face authentication system or the credit card or the like used.

According to the above configuration, it is possible to prevent damage due to a fraudulent act by continuously monitoring an amount betted by a game participant and win or lose of a game, comparing data obtained by a probability statistic calculation or past statistical data, and detecting a suspicious pattern suspected of being fraudulent.

The foregoing and other objects, features, aspects and advantages of the exemplary embodiments will become more apparent from the following detailed description of the exemplary embodiments when taken in conjunction with the accompanying drawings.

DETAILED DESCRIPTION EMBODIMENTS

An outline of a fraudulence monitoring system 10 of a game table in a game hall will be described below with reference to the accompanying drawings. Here, the table game includes various table games such as baccarat, blackjack, poker, bridge, roulette, and dice. Representatively, a baccarat game will be described below by way of example.

Figure 1:
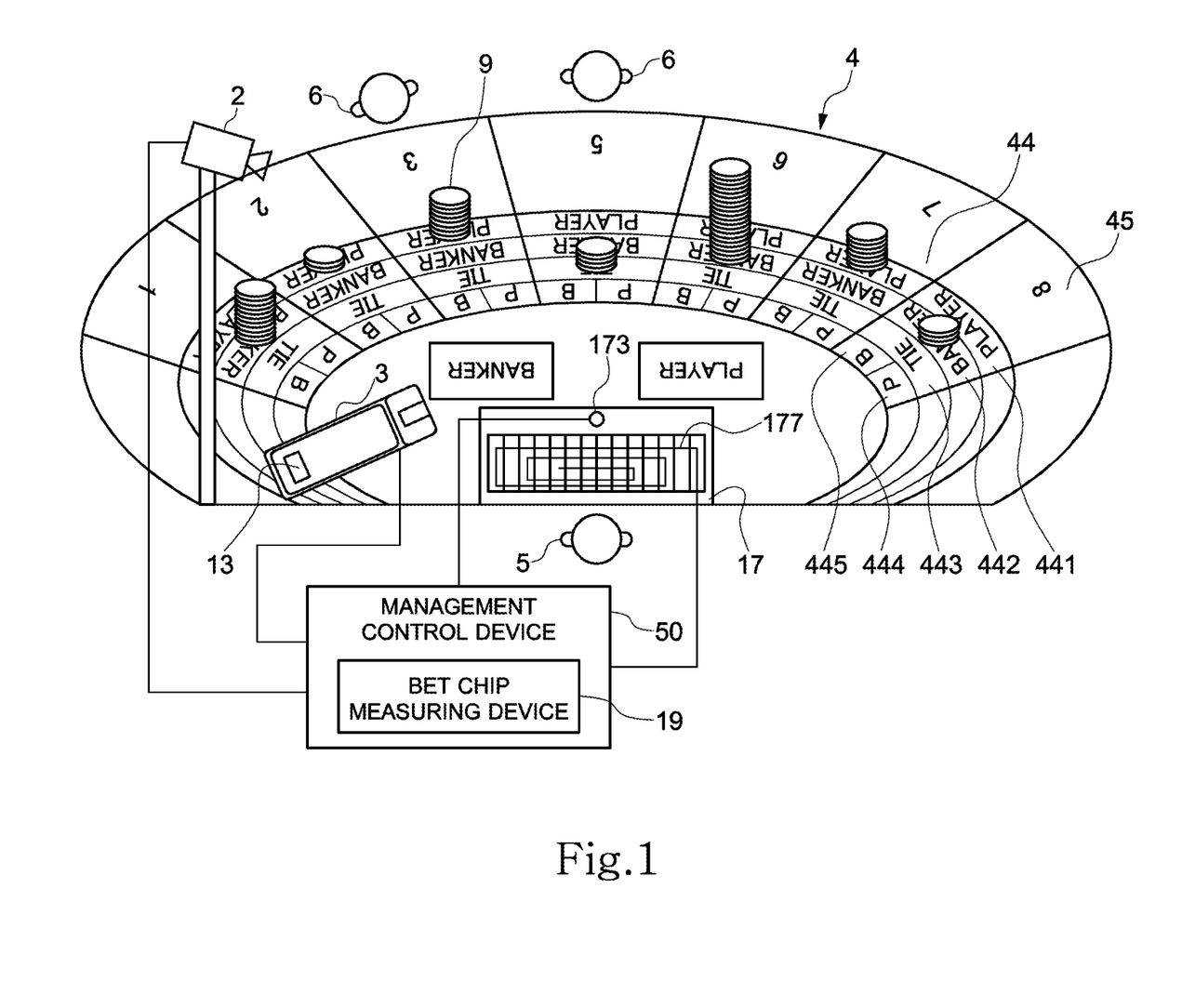
FIG. 1 is a diagram schematically showing the whole fraudulence monitoring system in a game hall having a game table according to an embodiment of the present disclosure.
Figure 2:
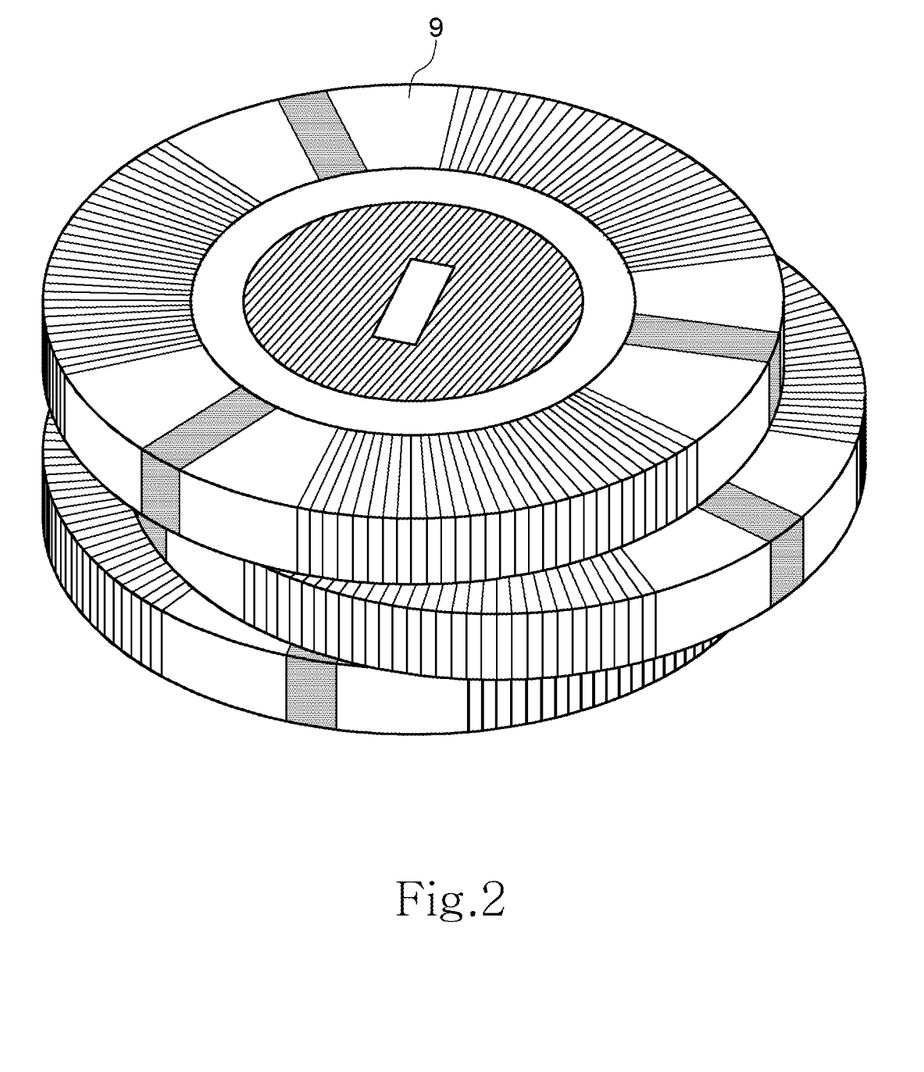
FIG. 2 is a perspective view of a chip showing an example of an overlapping state of grasped chips in the embodiment of the present disclosure.

FIGS. 1 and 2 are diagrams showing the whole fraudulence monitoring system 10. The game table 4 is a table for baccarat, and is provided with each bet area 44 for seven game participants 6. Each bet area 44 for each game participant 6 includes each area for a player 441, a banker 442, a tie 443, a player pair (P) 444, and a banker pair (B) 445. Each game participant 6 places game tokens 9 representing a bet amount on each area corresponding to a target to be bet, thereby making a bet.

A win or lose determination device which determines win or lose results for each game in the game table 4 uses a card distribution device 3. The card distribution device 3 is a so-called electronic shoe already used by those skilled in the art, and is programmed with rules of a game in advance and has a structure to make it possible to determine a win or lose of a game by reading information on a playing card to be distributed. For example, in the baccarat game, the win of the banker, the win of the player, the tie (draw) and the pair (ranks of playing cards of a player or banker are the same) are basically determined by ranks of 2 and 3 cards, and the determination result (win or lose result) is displayed by a result display lamp 13. In addition, the card distribution device 3 sends the win or lose result of the determined game to a management control device 50.

However, according to another embodiment, instead of the card distribution device 3, a win or lose determination device may determine a win or lose by image recognition of a drawn playing card using a camera device 2.

The camera device 2 is provided above the game table 4 to photograph the bet area 44. The game table 4 according to the present embodiment is provided with seven player positions 45 ("1", "2", "3", "5", "6", "7", and "8" in FIG. 1), and seven game participants 6 can participate in the game. The camera device 2 photographs the bet areas 44 of all the player positions 45. One camera device 2 does not necessary photograph the bet areas 44 of all the player positions 45, but a plurality of camera devices 2 may photograph all the bet areas 44 in a shared manner.

The game token 9 has a mark, a pattern and/or a color (may also have both of them) which can specify a type (value) of game token 9 on a surface and/or a side of the game token 9, and a bet chip measuring device 19 specifies positions (to be betted), types, and the number of game tokens 9 placed on the bet areas 44 from colors of edges of side surfaces of the game tokens 9 based on the image photographed by the camera device 2. In this case, the bet chip measuring device 19 may be configured to recognize hiding (when a part of one chip is hidden, or when the entire chip is hidden) or the like due to dead spots of the game token 9 using a self-learning function or the like based on the existing artificial intelligence-based computer or control system and a deep learning (structure) technology, thereby accurately grasping the positions and number of game tokens.

Figure 4:
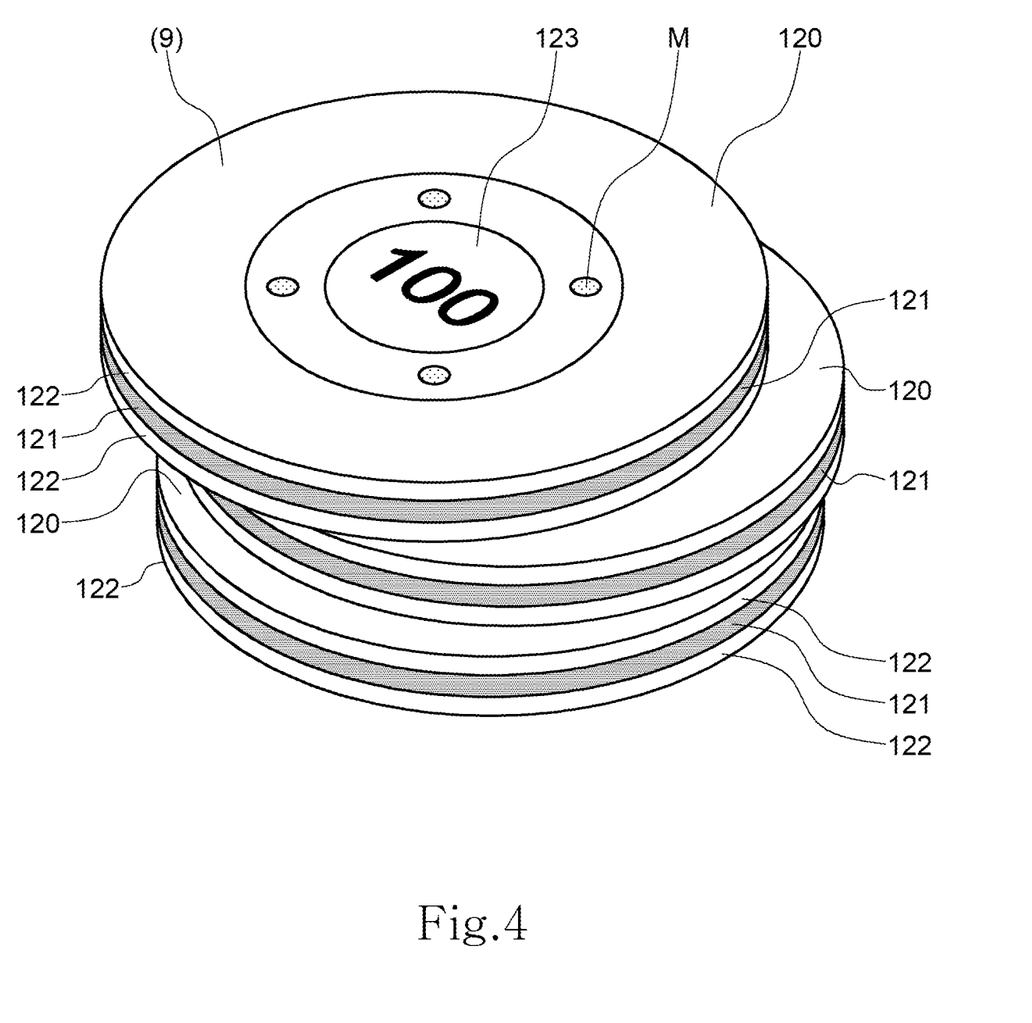
FIG. 4 is a perspective view of a chip showing another example of the overlapping state of grasped chips in the embodiment of the present disclosure.

In addition, as shown in FIG. 4, the game token 9 may be configured to have a plurality of plastic layers which have different colors and are stacked, a colored layer 121 which is at least disposed in the middle of the plurality of plastic layers, and white layers or light color layers 120 which have the colored layer 121 sandwiched therebetween and are stacked on both sides of the game token 9 to form a stripe pattern on the side surface of the game token 9 in a stacked direction, such that the colored layer can specify a type of game tokens 9. In this case, it is possible to specify types (10 points, 20 points, 100 points, 1000 points, or the like) of game tokens 9 by changing colors (red, green, yellow, blue, or the like) of the colored layer 121.

In such a case, the game token has a multilayered structure stacked as shown in FIG. 4 (compared with the existing chip shown in FIG. 2) and has the striped pattern distinctly formed on the side surface thereof in the stacked direction, such that the bet chip measuring device 19 can easily measure accurately the types and number of game tokens 9.

Figure 3:
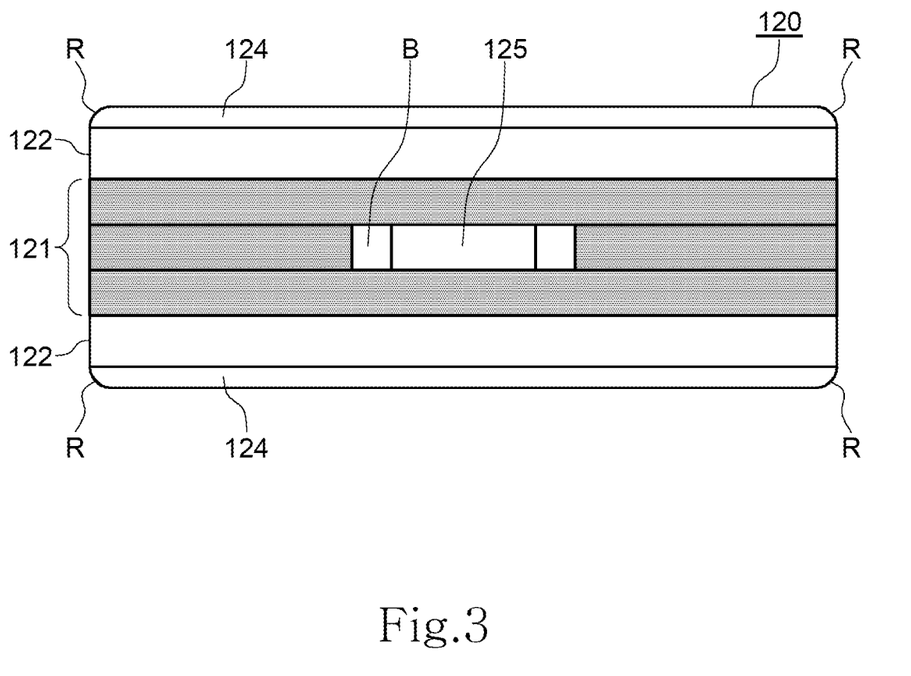
FIG. 3 is a front cross-sectional view of a game token in the embodiment of the present disclosure.

Alternatively, the structure which detects the position 8 and the type of game token 9 in the bet area 44 is not limited thereto, and for example, as shown in FIG. 3, the game token 9 may be configured to have an RFID 125 embedded in the game token 9, with the RFID 125 storing information which can specify the type of game tokens 9 and an RFID antenna (not shown) which is provided on the game table 4 and reads ID to specify and detect the positions (to be betted), the type, and the number of game tokens 9 placed in the bet area 44.

A game token tray 17 for a dealer 5 to accommodate the game token 9 is provided in front of the dealer 5 of the game table 4. At least a part of the game token tray 17 is embedded in the game table 4. In the game token tray 17, the bet chip measuring device 19 analyzes and measures the game token 9 stacked in a horizontal direction, thereby determining the type and the number of game tokens 9. In this case, the bet chip measuring device 19 may specify the positions (to be betted), the type, and the number of game tokens 9 accommodated in the game token tray 17 from the color or the like of the edge of the side surface of the game token 9 and the like, based on the image photographed by the camera device 2, and for example, as shown in FIG. 3, the game token 9 may be configured to have the RFID 125 embedded in the game token 9, with the RFID 125 storing the information which can specify at least the type of game tokens 9 and the RFID antenna (not shown) which is provided on the game table 4 and reads the ID to specify and detect the positions (to be betted), the type, and the number of game tokens 9 accommodated in the game token tray 17.

The management control device 50 serves to grasp the positions, the type, and the number of game tokens 9 on the game table 4 which are obtained by the bet chip measuring device 19, perform a balance calculation on the casino side in the game table 4 using the win or lose result obtained from the card distribution device 3 as the win or lose determination device, stores the number of games performed on the game table 4, and specifies a position and an amount of game token 9 that the game participant 6 places on the game table 4 based on the measurement result of the bet chip measuring device 19 in each game and stores the specified position and amount of game token 9 in each game participant 6 or player positions 45 of the game table 4.

In addition, the management control device 50 has a calculation function which calculates settlement amounts for each game (balance calculation on the casino side in the game table 4) for each game, and is configured to settle a total amount of game tokens 9 in the game token tray 17 of the dealer 5 of the game table 4 with the betted game token 9 of the game participant 6 after each game and then be able to compare and calculate whether an increase and decrease in the game token corresponding to the settlement is correct. The management control device 50 can verify the total amount of game tokens 9 of the game token tray 17 at all times (or a predetermined time interval).

Figure 7:
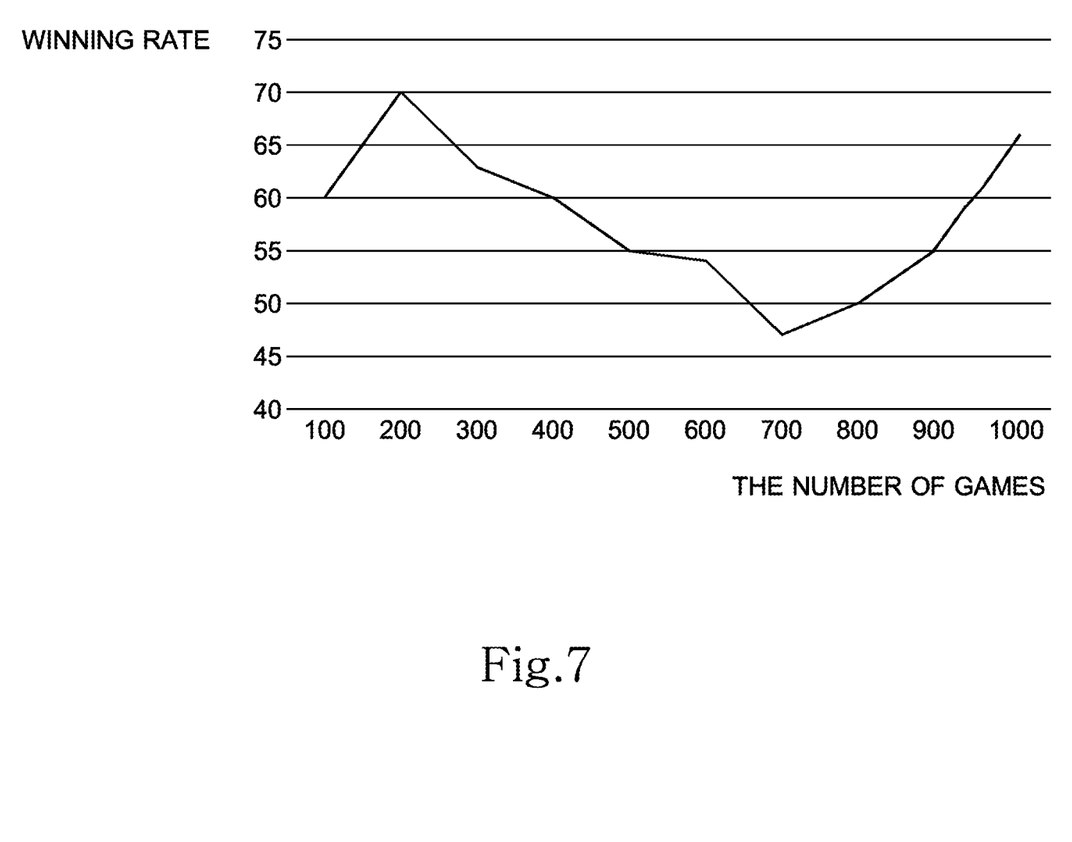
FIG. 7 is a graph showing a winning rate of a game participant according to the embodiment of the present disclosure.

The management control device 50 stores the total number of games in which the same person for each game participant 6 or player position 45 participates, a transition of bet chip amounts for each game, and a return amount obtained in each game. The return amount is an amount of money obtained by betting of the game participant 6. The management control device 50 calculates a winning rate at the time of the end of each game as shown in FIG. 7 on the basis of the calculation on the total number of games, the transition of the bet amounts for each game, and the return amounts obtained in each game, aggregates the return amount obtained in each game, and obtains results of an actual wining rate and a total return amount of the same person for each game participant 6 or player position 45. The management control device 50 compares the obtained actual winning rate and total return amount with figures obtained by a probability statistic calculation to determine whether there is a significant difference therebetween and specifies any one of the game participant 6 or the player position 45, the game table 4, or a room having the game table 4 where the significant difference is occurring.

Specifically, for example, the management control device 50 may determine that there is a significant difference when the ratio of the winning rate to the total number of games is higher than a predetermined threshold value as compared with the number on the probability statistical calculation, may determine that there is a significant difference when the ratio of the total return amount to the total number of games is higher than a predetermined threshold value as compared with the number on the probability statistical calculation, may determine that there is a significant difference when the ratio of the winning rate to the total return amount is higher than a predetermined threshold value as compared with the number on the probability statistical calculation, may determine that there is a significant difference when the total return amount obtained by one participant is higher than a predetermined threshold value as compared with the number on the probability statistical calculation, or may determine there is a significant difference according to other criteria.

Figure 5:
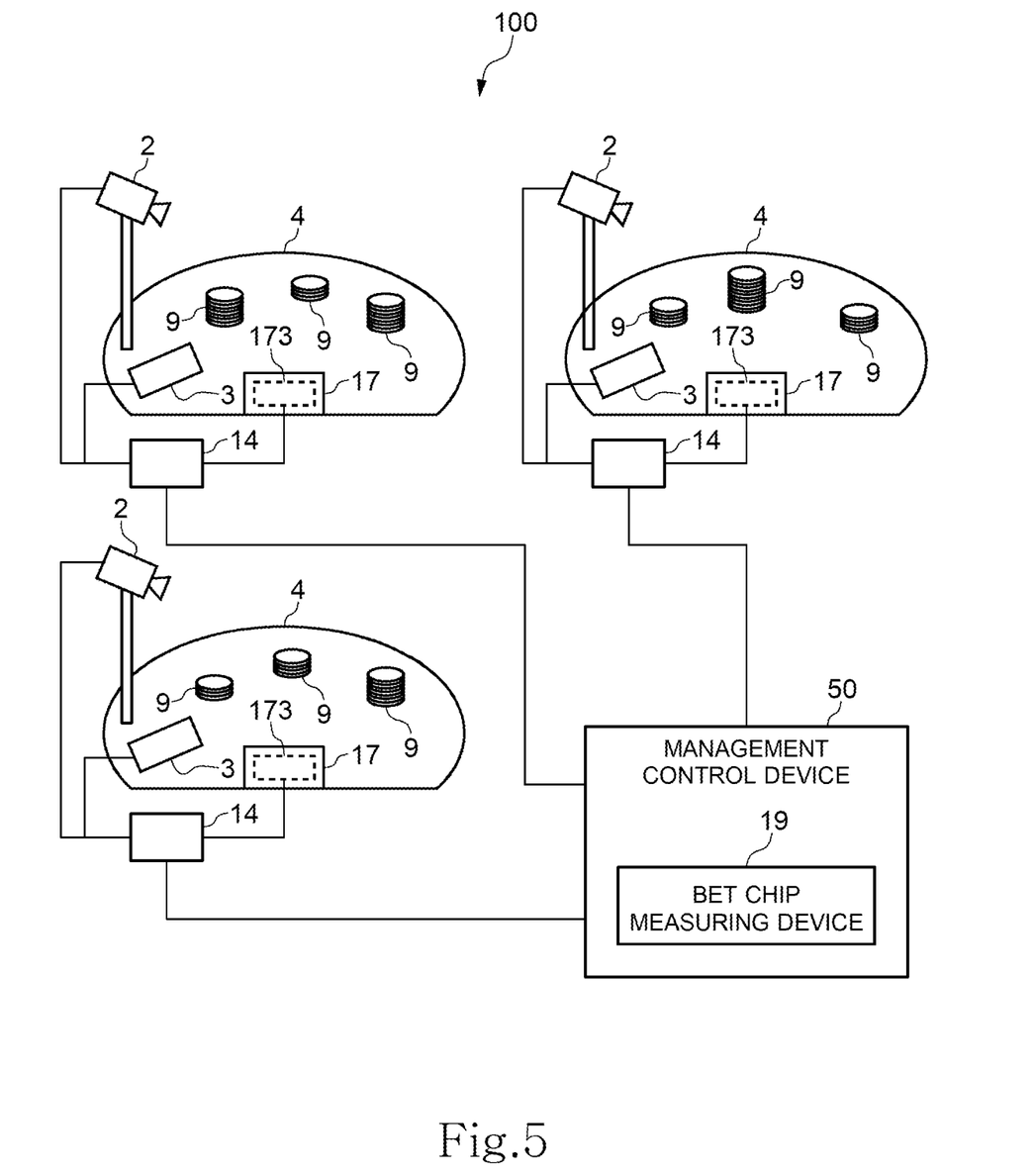
FIG. 5 is a schematic diagram of a casino system having a plurality of game tables according to the embodiment of the present disclosure.

FIG. 5 shows an overall view of a room having a plurality of game tables 4. The management control device 50 stores the total number of games, the transition of the bet amounts for each game, the return amounts obtained in each game for each same person for each game participant 6 or player position 45 in each of the plurality of game tables 4, and obtains the winning rate and the total return amount. In addition, the management control device 50 may store the total number of games, the transition of the bet amounts for each game, the return amounts obtained in each game for each game table 4 and each room, and may obtain the winning rate and the total return amount. By doing so, it is possible to detect cooperative fraudulent acts in the entire game table or the entire room.

The management control device 50 may further have a function which specifies the dealers 5 in each game and may have a function which specifies the dealer 5 responsible for the series of games in which the significant difference occurs. In addition, the management control device 50 stores the total number of games for each dealer 5, the transition of the bet chip amounts for each game, the return amounts obtained in each game and obtains the winning rate and the total return amount, thereby detecting a dealer 5 that is highly likely to lead a fraudulent act.

Figure 6:
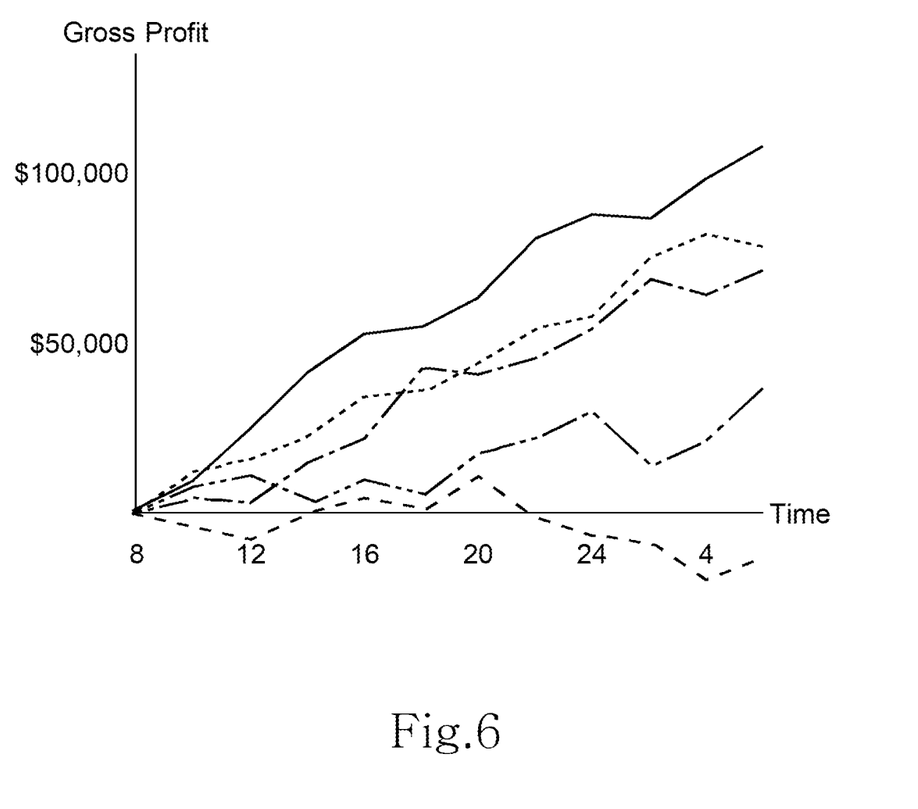
FIG. 6 is a diagram showing an example of a graph showing a return amount for each game participant according to the embodiment of the present disclosure.

FIG. 6 is a diagram showing the transition of the total return amounts for each game participant 6 over time, in which it is possible to detect the game participant 6 who is highly likely to do a fraudulent act by comparing the data obtained by the probability calculation or the past statistical data with the total return amounts or by comparing the total return amounts with each other among the game participants 6.

The management control device 50 includes a calculation function which factorizes the total return amount in a series of games in which the significant difference has occurred to specify whether the occurrence cause of the significant difference in a series of games in which the significant difference has occurred is due to the winning rate or due to a magnitude of a betted amount of a bet chip. That is, it is possible to determine whether although the same amount of money is betted upon winning and losing, since the probability of winning is merely high, the total return amount is large or although the probability of winning is not so high, since a large amount of money is betted upon winning and a small amount of money is betted upon losing, the total return amount is large.

In addition, the management control device 50 includes a calculation function which stores the bet chip amounts for each game at the bet position having different return rates, and specifies whether the occurrence cause of the significant difference in a series of games in which the significant difference has occurred is associated with the bet position having different return rates. For example, in the baccarat game, the return rate is twice in the case of the player/banker, 8 times in the case of the tie, and 11 times in the case of the pair. Therefore, it is possible to detect a betting method to win only in a betting side where the possibility of fraudulent act is high and the return rate like the tie or the pair is high. In particular, the tie is established if 10 or continuous picture cards J, Q, and K are in the game, and therefore is famous for a fraudulent act.

Further, the management control device 50 has a plurality of criteria for determining whether there is the significant difference, and issues a different kind of warning for each criterion. For example, if the detected significant difference is a significant difference which can occur at a frequency of about once every three days, a warning of a first stage is issued, if the detected significant difference is a significant difference which can occur at a frequency of about once a week, a warning of a second stage is issued, and if the detected significant difference is a significant difference which can occur at a frequency of about once a month, a warning of a third stage is issued. Upon the detection of the fraudulence, abnormality display lamps 16 provided on the win or lose determination device 3 or both sides of the game table 4 are turned on, and the detection of the fraudulence is output to a casino management department or the like in a wireless or wired manner. A monitor or a lamp which performs a warning or a display in response to the determination result may further be provided in another place. In addition, it may be configured to be able to play the VTR recorded in the camera device 2 when receiving a warning.

FIG. 7 is a graph showing a change in the number of games of a winning rate of a game participant 6. In this case, for example, a winning rate is high in the range of 100th to 200th games, but if the number of games is small, the warning of the first stage is issued because the winning rate is in the range which may occur by the probability calculation. Thereafter, since the wining rate is lowered, the warning disappears once, but the winning rate increases again at a 1000th game. In this case, the winning rate is high regardless of the large number of games, which is an event that rarely occurs by the probability calculation. As a result, the warning of the third stage is issued.

Figure 8:
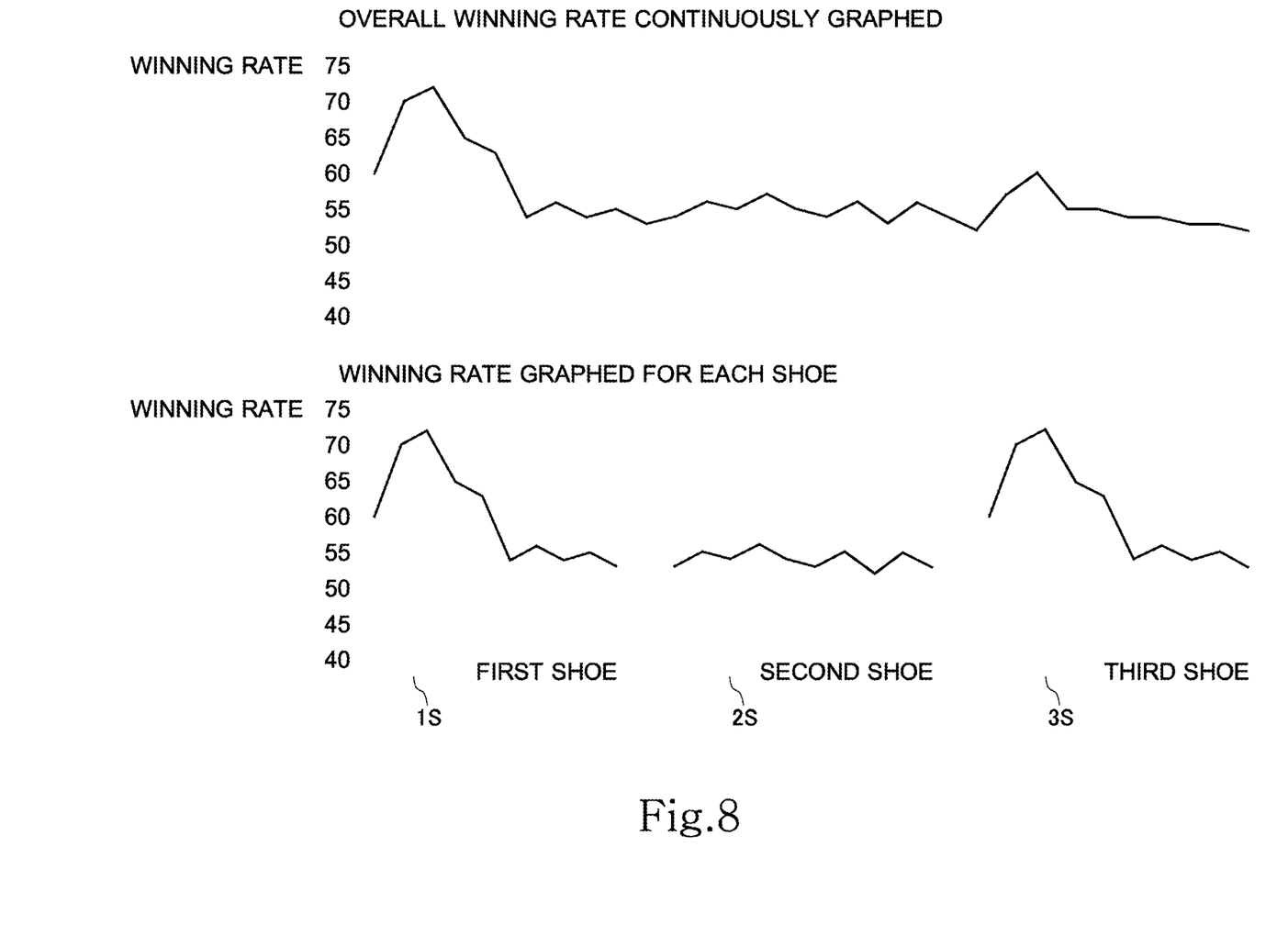
FIG. 8 is another graph showing a winning rate of a game participant according to the embodiment of the present disclosure.

In addition, the management control device 50 has determination criteria having different significant differences for the number of games divided by a predetermined rule or for each of the predetermined number of games and thus issues a different kind of warnings. For example, in the table game using a shuffle playing card like the baccarat, the shuffle playing card in which playing cards corresponding to 8 to 10 decks are shuffled and are accommodated in a box is set in the card distribution device 3 to perform a game. FIG. 8 shows a graph in which data of winning rates divided (of shoe 1S, shoe 2S, and shoe 3S) by box (this is referred to as shoe) of the shuffle playing card used in the game are aggregated. By doing so, it is possible to detect a fraudulent act such as knowing the arrangement order of specific shuffle playing cards in the box that cannot be detected only by monitoring the overall winning rate. In the graph of the upper part of FIG. 8 showing the overall winning rate continuously monitored, it seems that the winning rate is high first and there is no feature later. However, looking at the graphs divided by shoe in the lower part of FIG. 8, in the shoe 3S, it is possible to detect that the winning rate is high and the possibility of the fraudulent act is high. In addition, it possible to detect that the shoe 1S and the shoe 3S become the graph of the same winning rate and the possibility of the fraudulent act is high.

In addition, the management control device 50 determines whether there are significant differences for each game sequentially or every time the predetermined number of games is progressed in accordance with the progress of the plurality of games, and issues a warning when the determination criteria on the significant difference exceed. For example, it is difficult to determine that there is a significant difference even if the winning rate is 70% in the case in which 50 games are performed, but if the winning rate is 70% after 500 games are performed, it is determined that there is a significant difference and the suspicion of the fraudulent act is increased.

In addition, the management control device 50 may calculate an occurrence probability for each game unit and determine whether there is a significant difference or not. If each game unit consists of, for example, 75 games, the management control device 50 calculates the probability of obtaining the actual results of the 1st to the 75th games, then calculates the probability of obtaining the actual result of the 2nd to the 76th games, and calculates the probability for each game unit in the same way, and outputs a warning when the occurrence probability exceeds the judgment criterion of the significant difference. The game unit is not limited to one consisting of 75 games, but may consists of 100 games, 300 games or the like. Further, the management control device 50 may calculate the occurrence probability for each bet type or each box number.

In addition, the management control device 50 has a plurality of criteria which determine whether there is a significant difference and specifies the game participant 6 or the player position 45 having the fraudulence possibility for each criterion to be able to display scores for each different criteria and display scores or ranks for warnings.

In addition, the management control device 50 can obtain the figures obtained by the probability statistic calculation used to determine whether there is a significant difference based on a conditional probability calculation when a specific element is a fixed value. For example, the calculation may be performed by fixing the number of games and using the conditional probability calculation.

The management control device 50 further has a function which sequentially grasps the playing cards or the spots of the dice from a series of games, and can estimate the fraudulence cause in the case in which it is determined that there is a significant difference based on the data of the spots from a series of games and enumerate the fraudulence cause with the possibility. For example, if a winner of a game is recognized based on the data of the spots from a series of games when a figure of the playing card first drawn is 9, it can be estimated that knowing the position of the playing card of 9 is the fraudulence cause.

In addition, the management control device 50 may estimate the fraudulence cause determined that there is the significant difference using any one or both of big data on past games or past fraudulent data, and enumerate the cause with the fraudulence possibility.

In addition, the management control device 50 may include a calculation function which compares results of the income or expenditure of the casino side with figures obtained by a probability statistic calculation at the time of an end of a predetermined number of games, on the basis of a calculation on a total number of games performed on the respective game tables 4 and the transition of the income and expenditure of the casino side in each game to determine whether there is a significant difference therebetween, and specifies any one of the game tables 4 or a room having the game tables 4 where the significant difference is occurring. In this case, it is unnecessary to grasp the bet amounts for each game participant 6, and it is necessary to grasp only the balance of the game token tray.

Further, the fraudulence monitoring system of the table game may further include a device which specifies the game participant 6 of the game table 4 from information on a face authentication system or an ID card, credit card or the like used.

The face authentication system may acquire an image of a face by feature point extraction or the like, and allocate an identity number (ID or the like) to specify the image of the face. When the specified game participant 6 leaves his/her seat and sits on another game table, the face authentication system includes a warning function which informs the another game table of the existence of the specific player. Specifically, it is possible to warn a pit manager managing each game table 4 or a manager of each table.

According to another embodiment of the present invention, the management control device 50 stores the total number of games in which the same person for each game participant 6 or player position 45 participates, a transition of bet chip amounts for each game, and a return amount obtained in each game. The return amount is an amount of money obtained by betting of the game participant 6. The management control device 50 includes artificial intelligence having data of past fraudulent games taught as training data, and further includes a calculation function which determines whether a significant difference with fraudulence possibility occurs in any one of the game participant 6 or player position 45, the game tables 4, or a room having the game tables 4 at the time of an end of a predetermined number of games, on the basis of a calculation on a total number of games, a transition of bet chip amounts for each game, and a return amount obtained in each game.

For example, the management control device 50 is a control device of intelligent type, and is an artificial intelligence type or a deep learning structure which grasps the position (the betted position on the player, the banker, or the pair) and the amount (type and number) of the betted game token 9 on the game table 4 and compares the win or lose history and the obtained amount of chips (winning amount) of each game participant 6 from the win or lose results of each game with the statistical data of a large number (big data) of past games to be able to be extracted as a unique situation (set by the casino). Typically, in the situation in which a winning amount equal to or more than any amount of money (a million dollar) is generated or in the situation in which the state in which a bet chip amount betted on a losing side is small and a bet chip amount on a winning side is large is continued in several games at the play position 7 of the game table 4, the management control device 50 having the artificial intelligence type or a deep learning structure compares the situation with the statistical data (big data or the like) of past games to be able to be extracted as a unique situation. In addition, the management control device 50 can compare the statistical data of the past game to determine what the cause of the fraudulent act is.

Since the management control device 50 has the artificial intelligence having data of past fraudulent games taught as training data, it is possible to detect the fraudulent act of the type which is newly detected by the artificial intelligence.

The management control device 50 may estimate the fraudulence cause in the case in which there is a significant difference using the big data about the past game as an additional item and enumerate the causes with the fraudulence possibility.

In addition, in the fraudulence monitoring system according to another embodiment of the present invention, the management control device 50 includes artificial intelligence having data of past fraudulent games taught as training data, and further includes a calculation function which determines whether a significant difference with fraudulence possibility occurs in any one of the game participant 6 or player position 45, the game tables 4, or a room having the game tables 4 at the time of an end of a predetermined number of games, on the basis of a calculation on a total number of games in which the same person participates in each game participant 6 or player position 45, a transition of bet chip amounts for each game, a win or lose for each game, and a return amount obtained in each game.

According to another embodiment of the present disclosure, a fraudulence monitoring program of a table game, including: a win or lose determining step of grasping win or lose results for each game in a game table 4; a bet chip grasping step of grasping an amount of game tokens 9 that a game participant 6 bets on the game table 4 in each game; a game progressing, grasping, managing step of storing the number of games performed on the game table 4 and specifying bet patterns of the game tokens 9 that the game participant 6 places on the game table 4 using transition data of a bet chip in the bet chip grasping step in each game and storing the specified bet patterns in each game participant 6 or player positions 45 of the game table 4; and a step of verifying occurrence possibility of a fraudulence act, wherein the step of verifying the occurrence possibility of the fraudulence act includes a step of calculating an actual winning rate of the same person in each game participant or player position and a step of calculating a total return amount at the time of the end of a predetermined number of games, on the basis of grasping and calculating a total number of games in which the same person participates in each game participant 6 or player position 45, a transition of a bet chip amount, and a return amount for each game, a significant different determining step of comparing the obtained winning rate and total return amount with a winning rate and a total return amount based on a probability statistic calculation or past data to determine whether there is a significant difference therebetween in the predetermined number of games, and an abnormal spot determining step of specifying any one of the game participant or player position, the game table, or a room having the game table where the significant difference is occurring.

The step of verifying the occurrence possibility of the fraudulence act further includes a step of specifying the dealers 5 in each game and has a step of specifying the dealer 5 responsible for the series of games in which the significant difference occurs in the abnormal spot determining step.

The step of verifying the occurrence possibility of the fraudulence act further includes the artificial intelligence learning step that learns the data of the past fraudulent games as the training data.

The fraudulence monitoring system of the table game further includes a device which specifies the game participant 6 of the game table 4 from the information on the face authentication system or the credit card or the like used.

Figure 9:
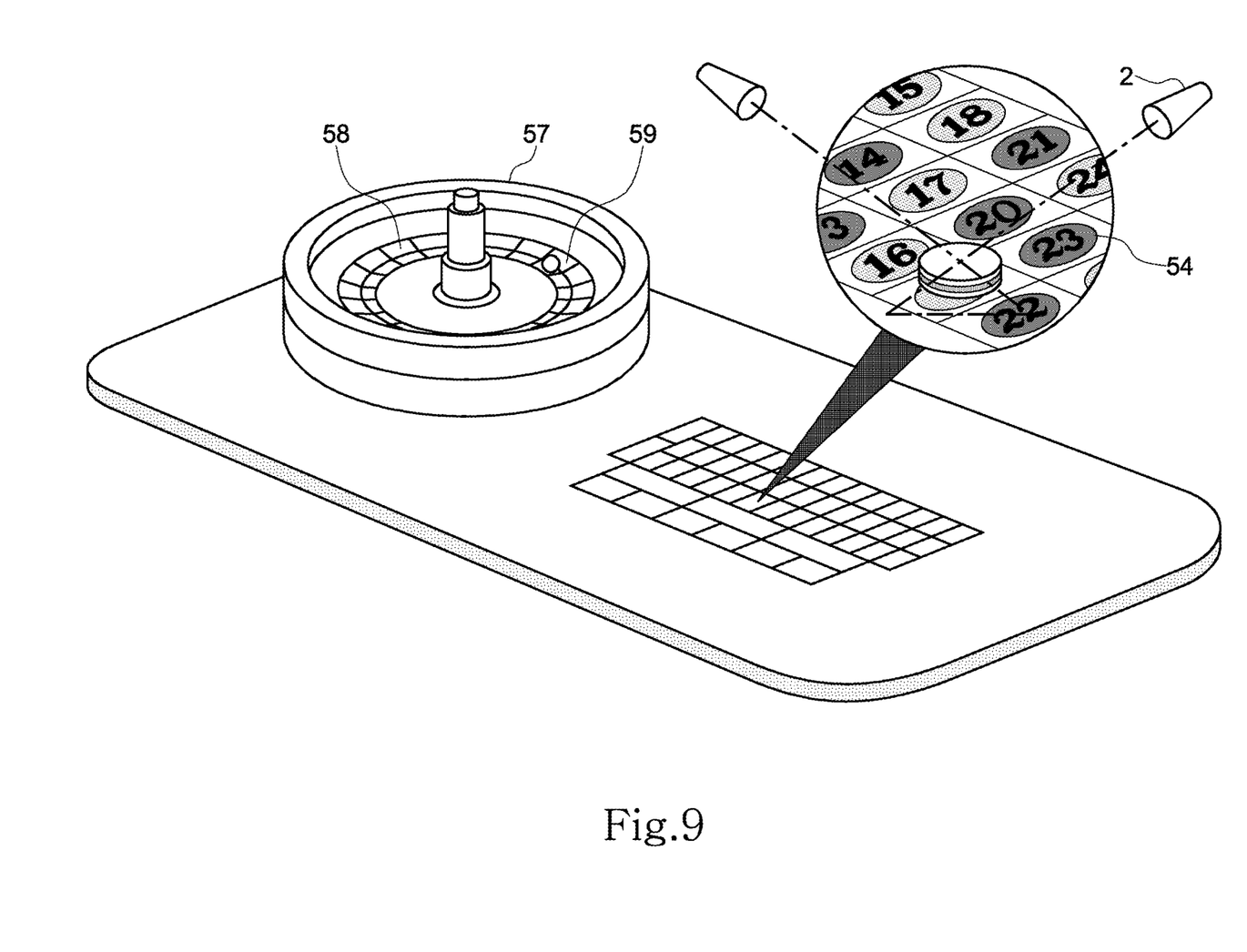
FIG. 9 is a diagram schematically showing a fraudulence monitoring system in a game table according to another embodiment of the present disclosure.

The example of the baccarat is described above, but the table game may also be the roulette as shown in FIG. 9. In the roulette, a kind of game token 9 having different colors is used for each player, and each game participant 6 performs betting by placing the game tokens 9 having different colors in each of the bet areas 54. The camera device 2 grasps the number and the amount of game tokens 9 betted in the bet area 54, and recognizes the colors of the game tokens 9 to grasp the game participants 6 in which the game tokens 9 are placed. The win or lose determination in the roulette is performed by allowing the camera device 2 to recognize a pocket 58 in which a ball 59 enters a wheel 57. Alternatively, the win or lose determination device which is performed by the manual input of the dealer 5 may be provided.

In addition, although not described in detail, the present disclosure may be applied to various table games such as blackjack, poker, bridge, and dice.

What is claimed:

1. A fraudulence monitoring system comprising:
   a first sensor configured to generate first sensor data based on detected distribution of one or more cards from a card shoe onto a game table;
   a second sensor configured to, for each game of one or more games played via the game table, generate second senor data that indicates an amount of objects and a position of the objects for a wager source, the wager source is a game participant or a player position;
   one or more processors coupled to the first sensor and the second sensor, the one or more processors configured to:
      for each game of the one or more games, determine a return amount obtained by the wager source in the game based on the amount of the objects for the game identified based on the second sensor data, a position of the objects for the game identified based on the second sensor data, and a win-lose result for the game determined based on the first sensor data;
      based on one or more return amounts associated with a predetermined number of the one or more games, determine a winning rate and a total return amount for the wager source over the predetermined number of the one or more games; and
      based on a comparison between a first numerical property of the determined winning rate and the determined total return amount, and a second numerical property of a winning rate and a total return amount obtained by a probability statistic calculation, determine whether there is a significant difference between the first numerical property and the second numerical property.

2. The fraudulence monitoring system according to claim 1, wherein the second sensor includes a camera or a radio frequency identification (RFID) sensor.

3. The fraudulence monitoring system according to claim 1, wherein the one or more processors is further configured to track, based on the first sensor data, the one or more games.

4. The fraudulence monitoring system according to claim 1, wherein the one or more processors is further configured to, for each game of the one or more games:
   obtain a win-lose result determined based on the first sensor data; and
   identify, based on the second sensor data, the amount of the objects and the position of the objects.

5. The fraudulence monitoring system according to claim 1, wherein the one or more processors is further configured to:
   receive a win-lose result indicator determined based on the first sensor data; and
   for each game of the one or more games, store token data associated with the amount of the objects for the game and the position of the objects for the game.

6. The fraudulence monitoring system according to claim 1, further comprising the card shoe, wherein the card shoe includes the first sensor.

7. The fraudulence monitoring system according to claim 1, wherein the one or more processors is further configured to perform the comparison based on the first numerical property of the determined winning rate and the determined total return amount, and the second numerical property of the winning rate and the total return amount obtained by the probability statistic calculation.

8. The fraudulence monitoring system according to claim 1, wherein the one or more processors include:
   a first processor configured to determine the win-loss result; and
   a second processor configured to determine the amount of the objects and the position of the objects.

9. The fraudulence monitoring system according to claim 1, wherein the one or more processors is configured to identify and output a cause of the significant difference.

10. The fraudulence monitoring system according to claim 1, wherein the one or more processors are further configured to:
    perform the comparison to determine whether there is the significant difference for each of at least two sequentially played ones of the one or more games or in response to the predetermined number of the one or more games having been played; and issue a warning based on the determined significant difference.

11. The fraudulence monitoring system according to claim 1, wherein the one or more processors are further configured to:
    perform the comparison to determine whether there is the significant difference according to each of a plurality of predefined criteria; and identify according to which of the plurality of predefined criteria the significant difference was identified.

12. The fraudulence monitoring system according to claim 11, wherein the one or more processors are configured to select one or more of a plurality of predefined warnings for output in response to the determined significant difference depending on which of the plurality of predefined criteria the significant difference was determined.

13. The fraudulence monitoring system according to claim 11, wherein the one or more processors are configured to determine respective scores for each of the plurality of predefined criteria.

14. The fraudulence monitoring system according to claim 1, wherein the one or more processors are configured to determine whether the significant difference is present based on a conditional probability calculation.

15. The fraudulence monitoring system according to claim 1, wherein the one or more processors is configured to:
   determine whether the significant difference is present by executing an artificial intelligence program developed with data of a past fraudulent game as training data; and
   identify the game table from a plurality of game tables or a room having the game table where the significant difference occurred.

16. The fraudulence monitoring system according to claim 15, wherein the one or more processors are further configured to:
   identify respective dealers managing respective ones of a plurality of games; and
   determine which of a plurality of game participants, which of the dealers, or which of a plurality of player positions, is associated with occurrence of the significant difference.

17. The fraudulence monitoring system according to claim 1, wherein the objects include game tokens or currency.

18. The fraudulence monitoring system according to claim 1, wherein the one or more processors are further configured to:
   correlate movement of the objects on the game table to one of the one or more games; and
   based on the correlated movement, determine a casino income and a casino expenditure at the game table for each of the one or more games;
   for the predetermined number of the one or more games, perform a comparison based on the determined casino income and the determined casino expenditure at the game table for each of the one or more games, and figures obtained by the probability statistic calculation and determine, based on the comparison, whether there is another significant difference therebetween according to each of a plurality of predefined criteria; and
   when the other significant difference is determined to be present:
      identify according to which of the plurality of predefined criteria the significant difference was identified; and
      identify the game table from a plurality of game tables or a room having the game table where the other significant difference occurred.

19. A fraudulence monitoring method comprising:
   receiving, at one or more processors from a first sensor, first sensor data based on a detected distribution of one or more cards from a card shoe onto a game table;
   receiving, at the one or more processors from a second sensor and for each game of one or more games played via the game table, second senor data that indicates an amount of objects and a position of the objects for a wager source, the wager source is a game participant or a player position;
   for each game of the one or more games, determining a return amount obtained by the wager source in the game based on the amount of the objects for the game identified based on the second sensor data, a position of the objects for the game identified based on the second sensor data, and a win-lose result for the game determined based on the first sensor data;
   based on one or more return amounts associated with a predetermined number of the one or more games, determining a winning rate and a total return amount for the wager source over the predetermined number of the one or more games; and
   based on a comparison between a first numerical property of the determined winning rate and the determined total return amount, and a second numerical property of a winning rate and a total return amount obtained by a probability statistic calculation, determining whether there is a significant difference between the first numerical property and the second numerical property.

20. The fraudulence monitoring method according to claim 19, further comprising issuing a warning based on the determined significant difference.

* * * * *